G. SCHERF.
KNEE JOINT FOR DOLLS.
APPLICATION FILED JULY 13, 1908.

906,566.

Patented Dec. 15, 1908.

UNITED STATES PATENT OFFICE.

GEORG SCHERF, OF SONNEBERG, GERMANY.

KNEE-JOINT FOR DOLLS.

No. 906,566.

Specification of Letters Patent.

Patented Dec. 15, 1908.

Application filed July 13, 1908. Serial No. 443,289.

*To all whom it may concern:*

Be it known that I, GEORG SCHERF, (whose post-office address is No. 84 Bahnhofstrasse, at Sonneberg, Saxe-Meiningen, Germany,) have invented certain new and useful Improvements in Knee-Joints for Dolls; and I do hereby declare the following to be a full, clear, and exact description of the invention, such as will enable others skilled in the art to which it appertains to make and use the same.

In the well known leather or rag dolls the legs have hitherto been connected to the thighs by means of hinged or screw joints which have not afforded perfect freedom of movement to the leg, and have also not allowed of an easy renewal of damaged parts.

The usual ball and socket knee joints which partly remedy the above stated drawbacks, have been used hitherto only in wooden dolls, because is has not been possible to hold the ball in the thigh socket and to pass a connecting cord through the stuffed thigh.

Now this invention consists of an improved ball and socket knee joint capable of use in leather or rag dolls, in which a knee pan of wood, paper pulp, or the like is arranged in the stuffed thigh for the purpose of guiding the ball of the joint, and fastening the cord that serves to hold the parts of the joint together. This cord instead of being fastened in the upper part of the doll, is passed through the leg of the doll and fastened in the foot.

Figure 1:
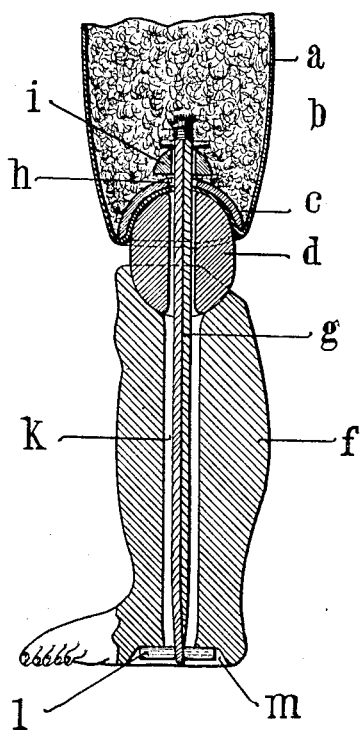
Figure 2:
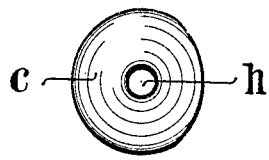

One construction of a knee joint and adjoining parts of a doll embodying the present improvements is illustrated by way of example in the accompanying drawing in which Figure 1 is a vertical section and Fig. 2 a plan of the knee pan shown separately.

In the covering $a$, of the stuffed thigh $b$, there is fixed a knee pan $c$, which serves to guide the usual ball $d$. This pan is preferably arranged wholly within the covering $a$ and it is held in place therein by the stuffing in the thigh. It might however be fixed in any other manner.

The leg $f$, is fitted to the ball $d$, in a movable manner as shown. It might, however, be fixed to it if desired. The connection of the parts of the joint is effected by means of rubber cord $g$, which is passed in one direction through a hole $h$, in the pan $c$, and fastened above the latter by means of a plug $i$, or the like, and is passed in the opposite direction through a hole $k$, extending through the leg $f$, and fastened in the foot in a removable manner by means of a pin $l$. For this purpose the foot is formed on its underside with a groove $m$, which receives the pin $l$, that is held in this groove by the elasticity of the rubber cords $g$.

The arrangement is such that the parts of the joint can be put together and the cords be fastened in a very simple manner, while it is merely necessary to remove the pin $l$, in order to be able to remove and replace the parts.

The cord may be fastened in any other manner, for instance by engaging a hook or the like in the foot.

What I claim and desire to secure by Letters Patent is:

1. In a doll, the combination of a stuffed body member composed of yielding material and provided with a socket member of substantially rigid material, a ball member of rigid material seated in said socket member, a second body member provided with a socket portion engaging said ball, and means for maintaining said members in articulated relation.

2. In a doll, the combination of a stuffed body member composed of yielding material and provided with a socket member, a ball member seated in said socket member, a second body member provided with a socket portion engaging said ball, a yielding means for maintaining said members in articulated relation.

3. In a doll, the combination of a stuffed body member composed of a covering of yielding material and a yielding filling material therefor, a socket member secured to the covering of said member, a ball member seated in said socket member, a second body member provided with a socket portion engaging said ball, and a cord entered in said second body member and extending therethrough and through said ball and socket portion of said first mentioned member and maintaining said members in articulated relation.

4. In a doll, the combination of a stuffed body member composed of a flexible and nonmetallic covering and a yielding filling, a socket member sunk in said body member and secured to the coverings thereof, a ball member engaging said socket member and provided with a passage or bore, a second body member provided with a socket portion engaging said ball member and having a longitudinal bore, and an elastic cord passing through said members and secured removably to said second body member and permanently to said socket member of said first mentioned body member.

In testimony whereof I affix my signature in presence of two witnesses.

GEORG SCHERF.

Witnesses:
BERNHARD SCHILLING,
FRITZ SCHRAMM.